(12) United States Patent
Yanagida (10) Patent No.: US 9,300,211 B2
(45) Date of Patent: Mar. 29, 2016

(54) DC/DC CONVERTER, CONTROL CIRCUIT THEREOF, AND ELECTRONIC APPARATUS

(71) Applicant: ROHM CO., LTD., Kyoto (JP)

(72) Inventor: Osamu Yanagida, Kyoto (JP)

(73) Assignee: ROHM CO., LTD (JP)

( * ) Notice: Subject to any disclaimer, the term of this patent is extended or adjusted under 35 U.S.C. 154(b) by 15 days.

(21) Appl. No.: 14/478,662

(22) Filed: Sep. 5, 2014

(65) Prior Publication Data

US 2015/0069986 A1    Mar. 12, 2015

(30) Foreign Application Priority Data

Sep. 9, 2013    (JP) ................................ 2013-186536

(51) Int. Cl.
*H02M 3/158*    (2006.01)
*H02M 1/15*    (2006.01)
*H02M 1/00*    (2007.01)

(52) U.S. Cl.
CPC .... *H02M 3/1582* (2013.01); *H02M 2001/0025* (2013.01)

(58) Field of Classification Search
CPC ..................................................... H02M 3/158
See application file for complete search history.

(56) References Cited

U.S. PATENT DOCUMENTS

| 7,522,432 B2* | 4/2009 | Shimizu | H02M 1/4208 323/225 |
| 7,852,056 B2* | 12/2010 | Nishida | H02M 3/157 323/282 |
| 8,212,538 B2* | 7/2012 | Nishida | H02M 3/1563 323/271 |

FOREIGN PATENT DOCUMENTS

JP    2005304295 A    10/2005

* cited by examiner

*Primary Examiner* — Emily P Pham
(74) *Attorney, Agent, or Firm* — Cantor Colburn LLP (57) ABSTRACT

A control circuit of a step-up/step-down DC/DC converter includes: a hysteresis comparator configured to receive a feedback voltage and a reference voltage, compare the feedback voltage with a threshold voltage corresponding to the reference voltage, and generate a pulse signal indicating a result of the comparison; a logic unit configured to fix a second switching transistor at an OFF state and switch a first switching transistor based on the pulse signal in a step-down mode and fix the first switching transistor at an ON state and switch the second switching transistor based on the pulse signal in a step-up mode.

23 Claims, 9 Drawing Sheets

DC/DC CONVERTER, CONTROL CIRCUIT THEREOF, AND ELECTRONIC APPARATUS

CROSS-REFERENCE TO RELATED APPLICATION

This application is based upon and claims the benefit of priority from Japanese Patent Application No. 2013-186536, filed on Sep. 9, 2013, the entire contents of which are incorporated herein by reference.

TECHNICAL FIELD

The present disclosure relates to a DC/DC converter (switching regulator).

BACKGROUND

Recent electronic apparatuses, such as mobile phones, tablet personal computers (PCs) and so on, are equipped with a liquid crystal display driver and various kinds of processors requiring a voltage higher than a battery voltage. A DC/DC converter is used to supply a proper power supply voltage to such devices.

One type of DC/DC converter control system is a hysteresis control system which provides higher load responsiveness than voltage mode and current mode control systems using an error amplifier.

Figure 1A:
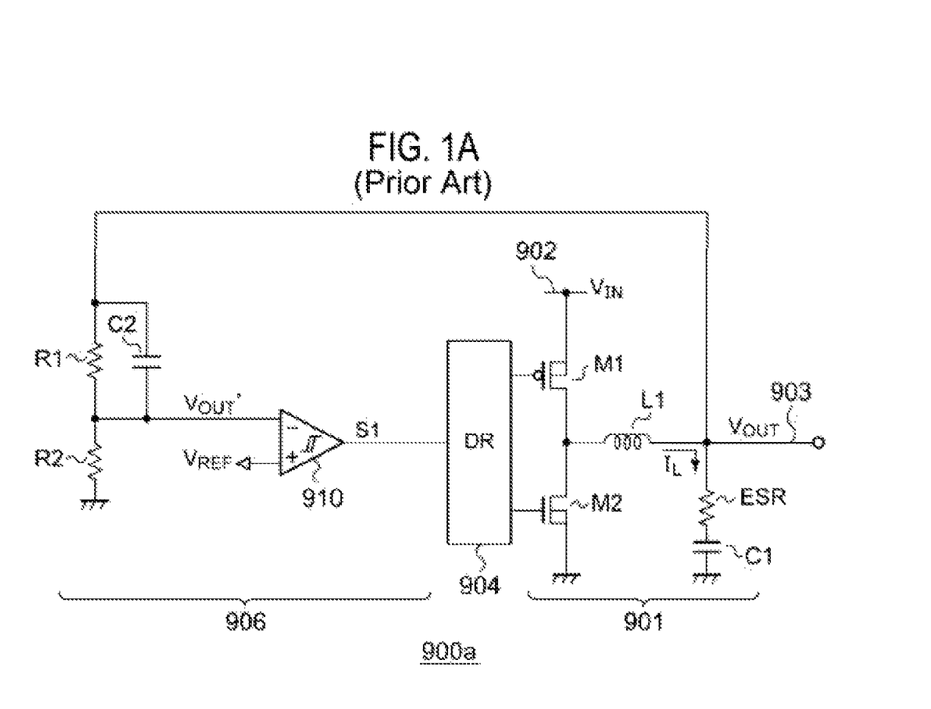
FIGS. 1A and 1B are circuit diagrams showing a step-down DC/DC converter employing a hysteresis control system.
Figure 1B:
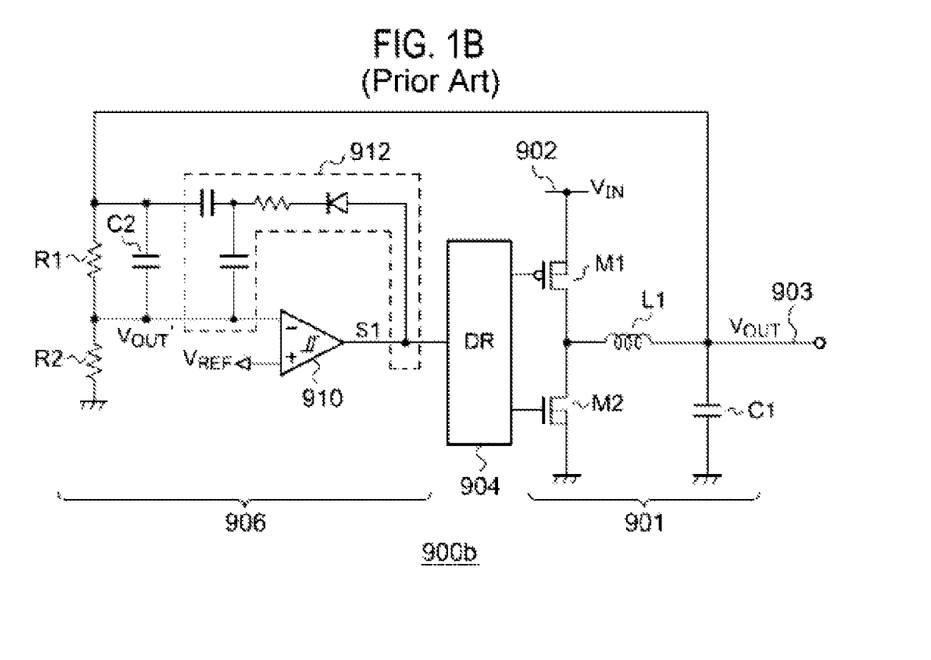

FIGS. 1A and 1B are circuit diagrams showing a step-down DC/DC converter employing a hysteresis control system.

A step-down DC/DC converter 900a of FIG. 1A includes an output circuit 901, a driver 904 and a pulse modulator 906. The step-down DC/DC converter 900a stabilizes an input voltage $V_{IN}$ of an input line 902 to a predetermined voltage level, and supplies it to a load (not shown) connected to an output line 903. The output circuit 901 includes a switching transistor M1, a synchronous rectification transistor M2, an inductor L1 and an output capacitor C1. The output capacitor C1 includes an equivalent series resistor (ESR).

The pulse modulator 906 generates a pulse signal S1 whose duty cycle is adjusted such that an output voltage $V_{OUT}$ approaches a predetermined target level. The pulse modulator 906 includes resistors R1 and R2, a capacitor C2 and a hysteresis comparator 910.

The resistors R1 and R2 divide the output voltage $V_{OUT}$. The divided output voltage $V_{OUT}$ is also called feedback voltage $V_{OUT'}$. The hysteresis comparator 910 compares the feedback voltage $V_{OUT'}$ with a threshold voltage $V_{TH}$ and generates the pulse signal S1 indicating a result of the comparison. The threshold voltage $V_{TH}$ transitions between two voltage levels $V_H$ and $V_L$ based on the comparison result. The pulse signal S1 has a high level for $V_H > V_{OUT'}$ and a low level for $V_L < V_{OUT'}$.

The driver 904 turns on the switching transistor M1 and turns off the synchronous rectification transistor M2 when the pulse signal S1 has a high level, and turns off the switching transistor M1 and turns on the synchronous rectification transistor M2 when the pulse signal S1 has a low level.

Figure 2:
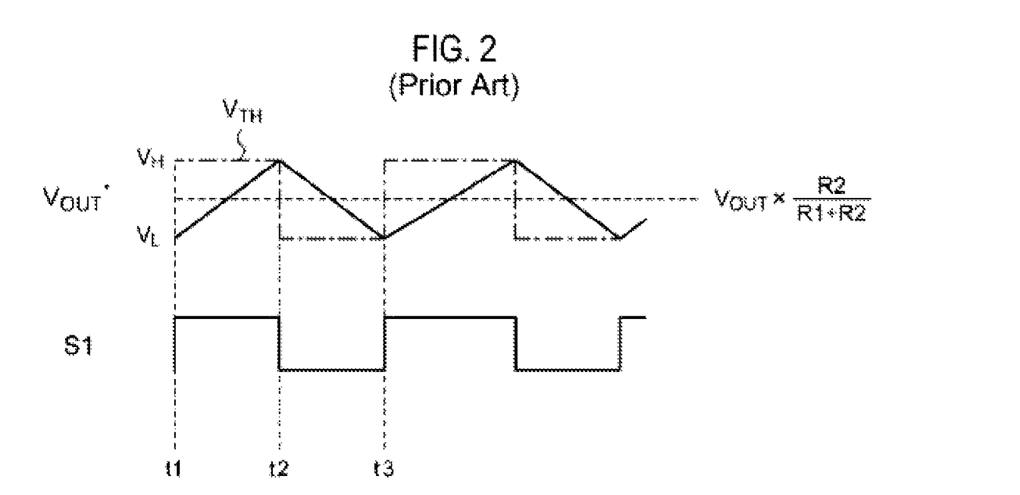
FIG. 2 is an operation waveform diagram of the step-down DC/DC converter of FIG. 1A.

FIG. 2 is an operation waveform diagram of the step-down DC/DC converter 900a of FIG. 1A. At time t1, the pulse signal S1 transitions to a high level. At this time, the threshold voltage $V_{TH}$ transitions to the upper level $V_H$.

During the period where the pulse signal S1 has a high level, a coil current $I_L$ increases and a voltage drop of the ESR increases accordingly. As a result, the output voltage $V_{OUT}$ increases and the feedback voltage $V_{OUT'}$ increases accordingly. At time t2, when the feedback voltage $V_{OUT'}$ reaches the upper level $V_H$, the threshold voltage $V_{TH}$ transitions to the lower level $V_L$ and, at the same time, the pulse signal S1 from the hysteresis comparator 910 transitions to a low level.

During the period where the pulse signal S1 has a low level, the coil current $I_L$ decreases with time and the voltage drop of ESR increases accordingly. As a result, the output voltage $V_{OUT}$ decreases and the feedback voltage $V_{OUT'}$ decreases accordingly. At time t2, when the feedback voltage $V_{OUT'}$ reaches the lower level $V_L$, the threshold voltage $V_{TH}$ transitions to the upper level $V_H$ again and, at the same time, the pulse signal S1 from the hysteresis comparator 910 transitions to a high level.

The above-described operation is repeated by the step-down DC/DC converter 900a. As a result, the feedback voltage $V_{OUT'}$ is stabilized between $V_H$ and $V_L$ and the output voltage $V_{OUT}$ is stabilized between $V_H \times (R1+R2)/R2$ and $V_L \times (R1+R2)/R2$.

In the step-down DC/DC converter 900a of FIG. 1A, the voltage drop of the ESR of the output capacitor C1 is used as a ripple of the feedback voltage $V_{OUT'}$. However, this may cause a problem that a switching frequency is affected by variations in the ESR and a power loss due to the ESR is not negligible.

A ripple injection type step-down DC/DC converter has been proposed to overcome the problem of the step-down DC/DC converter 900a of FIG. 1A. FIG. 1B shows a ripple injection type step-down DC/DC converter 900b employing the hysteresis control system.

The step-down DC/DC converter 900b of FIG. 1B further includes a ripple injection circuit 912 in comparison to the step-down DC/DC converter 900a of FIG. 1A.

The ripple injection circuit 912 receives the output signal S1 of the hysteresis comparator 910 or a pulse signal correlated with the output signal S1 and superimposes a ripple on an input side of the hysteresis comparator 910. More specifically, the ripple injection circuit 912 superimposes a voltage inclined in a positive direction with respect to the feedback voltage $V_{OUT'}$ during the period where the output S1 of the hysteresis comparator 910 has a high level, that is, during the period where the switching transistor M1 is turned on and the synchronous rectification transistor M2 is turned off, and superimposes a voltage inclined in a negative direction with respect to the feedback voltage $V_{OUT'}$ during the period where the output S1 of the hysteresis comparator 910 has a low level, that is, during the period where the switching transistor M1 is turned off and the synchronous rectification transistor M2 is turned on. As a result, a ripple is superimposed on the feedback voltage $V_{OUT'}$ without using a ripple of the ESR.

An operation of the step-down DC/DC converter 900b of FIG. 1B will be described with reference to FIG. 2. At time t1, the pulse signal S1 transitions to a high level. At this time, the threshold voltage $V_{TH}$ transitions to the upper level $V_H$.

During the period where the pulse signal S1 has the high level, the feedback voltage $V_{OUT'}$ on which the positive-inclined voltage is superimposed by the ripple injection circuit 912 increases with time. At time t2, when the feedback voltage $V_{OUT'}$ reaches the upper level $V_H$, the threshold voltage $V_{TH}$ transitions to the lower level $V_L$ and, at the same time, the output S1 of the hysteresis comparator 910 transitions to a low level.

During the period where the pulse signal S1 has the low level, the feedback voltage $V_{OUT'}$ on which the negative-inclined voltage is superimposed by the ripple injection circuit 912 decreases with time. At time t3, when the feedback voltage $V_{OUT'}$ reaches the lower level $V_L$, the threshold voltage $V_{TH}$ transitions to the upper level $V_H$ again and, at the same time, the output S1 of the hysteresis comparator 910 transitions to a high level.

The above-described operation is repeated by the step-down DC/DC converter 900b. As a result, the feedback voltage $V_{OUT'}$ is stabilized between $V_H$ and $V_L$ and the output voltage $V_{OUT}$ is stabilized between $V_H \times (R1+R2)/R2$ and $V_L \times (R1+R2)/R2$.

SUMMARY

The present disclosure provides some embodiments of a ripple injection type step-up/step-down DC/DC converter and a control circuit thereof, which are capable of providing seamless switching between a step-down mode and a step-up mode.

According to one embodiment of the present disclosure, there is provided a control circuit of a step-up/step-down DC/DC converter. The step-up/step-down DC/DC converter includes: an input line to which an input voltage is applied; an output line to which a load is connected; a first switching transistor connected between the input line and a first switching node; a first rectification element connected between the first switching node and a ground; an inductor connected between the first switching node and a second switching node; a second switching transistor connected between the second switching node and the ground; a second rectification element connected between the second switching node and the output line; and an output capacitor connected between the output line and the ground. The control circuit includes: a hysteresis comparator configured to receive a feedback voltage corresponding to an output voltage generated in the output line at a first input terminal and a reference voltage at a second input terminal, compare the feedback voltage with a threshold voltage corresponding to the reference voltage, and generate a pulse signal indicating a result of the comparison; a logic unit configured to fix the second switching transistor at an OFF state and switch the first switching transistor based on the pulse signal in a step-down mode and fix the first switching transistor at an ON state and switch the second switching transistor based on the pulse signal in a step-up mode; a first buffer configured to generate a first ripple voltage having a first polarity which is synchronized with the pulse signal; a second buffer configured to generate a second ripple voltage having a second polarity which is synchronized with the pulse signal, the second polarity being opposite in phase to the first polarity; and a feedback circuit which includes a first feedback path and a second feedback path and is configured to superimpose the first ripple voltage on the feedback voltage via the first feedback path and superimpose the second ripple voltage on the reference voltage via the second feedback path, in the step-down mode and superimpose the first ripple voltage on the feedback voltage via the second feedback path and superimpose the second ripple voltage on the reference voltage via the first feedback path, in the step-up mode.

Switching between the step-down mode and the step-up mode occurs when a difference between the input voltage $V_{IN}$ and the output voltage $V_{OUT}$ of the DC/DC converter is small. Under such a situation, a voltage generated in the first feedback circuit in the step-down mode and a voltage generated in the first feedback circuit in the step-up mode take a similar voltage level and a voltage generated in the second feedback circuit in the step-down mode and a voltage generated in the second feedback circuit in the step-up mode take a similar voltage level. Therefore, by using two ripple voltages having opposite phases while exchanging between two different paths, discontinuity of the feedback voltage in the switching between the step-down mode and the step-up mode can be reduced, which can result in seamless switching between the step-down mode and the step-up mode.

The first feedback path may include a first feedback resistor and a first feedback capacitor connected in series between an input terminal and an output terminal of the first feedback path. The second feedback path may include a second feedback resistor and a second feedback capacitor connected in series between an input terminal and an output terminal of the second feedback path.

Resistance of the first feedback resistor may be equal to that of the second feedback resistor and capacitance of the first feedback capacitor may be equal to that of the second feedback capacitor. This allows voltages generated in the first feedback circuit and the second feedback circuit to be close to each other.

The first feedback path may further include a third feedback capacitor connected between the output line and a connection node between the first feedback resistor and the first feedback capacitor. The second feedback path may further include a fourth feedback capacitor connected between the output line and a connection node between the second feedback resistor and the second feedback capacitor.

Capacitance of the third feedback capacitor may be equal to that of the fourth feedback capacitor.

The feedback circuit may further include a first selector and a second selector. The first selector may include a first terminal connected to an output terminal of the first buffer, a second terminal connected to an output terminal of the second buffer, a third terminal connected to the input terminal of the first feedback path, and a fourth terminal connected to the input terminal of the second feedback path and may be configured to electrically conduct between the first terminal and the third terminal and between the second terminal and the fourth terminal in the step-down mode and electrically conduct between the first terminal and the fourth terminal and between the second terminal and the third terminal in the step-up mode. The second selector may include a fifth terminal connected to the output terminal of the first feedback path, a sixth terminal connected to the output terminal of the second feedback path, a seventh terminal connected to the first input terminal of the hysteresis comparator, and an eighth terminal connected to the second input terminal of the hysteresis comparator and may be configured to electrically conduct between the fifth terminal and the seventh terminal and between the sixth terminal and the eighth terminal in the step-down mode and electrically conduct between the fifth terminal and the eighth terminal and between the sixth terminal and the seventh terminal in the step-up mode.

The first buffer may be an inversion type or non-inversion type buffer to receive a first signal synchronized with the pulse signal, and the second buffer may be an inversion type or non-inversion type buffer to receive a second signal synchronized with the pulse signal.

The first signal and the second signal may have the same logical value, and one of the first buffer and the second buffer may be of the non-inversion type and the other may be of the inversion type.

The first signal and the second signal may have the same logical value as the pulse signal, the first buffer may be of the non-inversion type, and the second buffer may be of the inversion type.

Each of the first signal and the second signal may be the pulse signal.

The first signal may have the same logical value as the pulse signal, the second signal may have an inverted logical value of the pulse signal, the first buffer may be of the non-inversion type, and the second buffer may be of the non-inversion type.

The first signal and the second signal may have an inverted logical value of the pulse signal, the first buffer may be of the inversion type, and the second buffer may be of the non-inversion type.

The first signal may have an inverted logical value as the pulse signal, the second signal may have the same logical value as the pulse signal, the first buffer may be of the inversion type, and the second buffer may be of the non-inversion type.

The control circuit may further include an error amplifier configured to amplify an error between the feedback voltage and a predetermined voltage to generate the reference voltage.

The control circuit may further include a first comparator configured to compare the input voltage with a predetermined second threshold voltage. The logic unit may switch between the step-down mode and the step-up mode based on a result of the comparison by the first comparator.

The control circuit may further include a second comparator configured to compare a voltage at a node between the first feedback resistor and the first feedback capacitor with a voltage at a node between the second feedback resistor and the second feedback capacitor. The logic unit may switch between the step-down mode and the step-up mode based on a result of the comparison by the second comparator.

The control circuit may further include a third comparator configured to compare the reference voltage with a predetermined third threshold voltage. The logic unit may switch between the step-down mode and the step-up mode based on a result of the comparison by the third comparator.

Each of the first rectification element and the second rectification element may be a MOSFET (Metal Oxide Semiconductor Field Effect Transistor), and the logic unit may fix the MOSFET of the second rectification element at an ON state and complementarily switch the MOSFET of the first rectification element and the first switching transistor based on the pulse signal, in the step-down mode and fix the MOSFET of the second rectification element at an OFF state and complementarily switch the MOSFET of the first rectification element and the second switching transistor based on the pulse signal, in the step-up mode.

The first rectification element and the second rectification element may be constituted by diodes.

The control circuit may be integrated on a single semiconductor substrate. As used herein, the term "integrated" is intended to include both the case where all elements of a circuit are formed on a semiconductor substrate and the case where main elements of the circuit are integrated on the semiconductor substrate. In addition, some resistors, capacitors and the like for adjustment of a circuit constant may be provided outside the semiconductor substrate.

The control circuit may include the first switching transistor, the first rectification element, the second switching transistor and the second rectification element which are monolithically integrated.

According to another embodiment of the present disclosure, there is provided a step-up/step-down DC/DC converter including: an input line to which an input voltage is applied; an output line to which a load is connected; a first switching transistor connected between the input line and a first switching node; a first rectification element connected between the first switching node and a ground; an inductor connected between the first switching node and a second switching node; a second switching transistor connected between the second switching node and the ground; a second rectification element connected between the second switching node and the output line; an output capacitor connected between the output line and the ground; and the above-described control circuit which controls the first switching transistor, the first rectification element, the second switching transistor and the second rectification element.

According to another embodiment of the present disclosure, there is provided an electronic apparatus including the above-described step-up/step-down DC/DC converter.

Any combination of the above-described elements or changes in the representations of the present disclosure between methods and apparatuses are effective as embodiments of the present disclosure.

DETAILED DESCRIPTION

Some embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via another member as long as the other member has no substantial effect on the electrical connection of the member A, the member B and the member C or has no damage to functions and effects shown by a combination of the member A, the member B and the member C.

A ripple injection circuit employing a hysteresis control system may be applied to a step-down DC/DC converter or a step-up DC/DC converter. The present inventor has studied the application of ripple injection to a step-up/step-down DC/DC converter.

Figure 3:
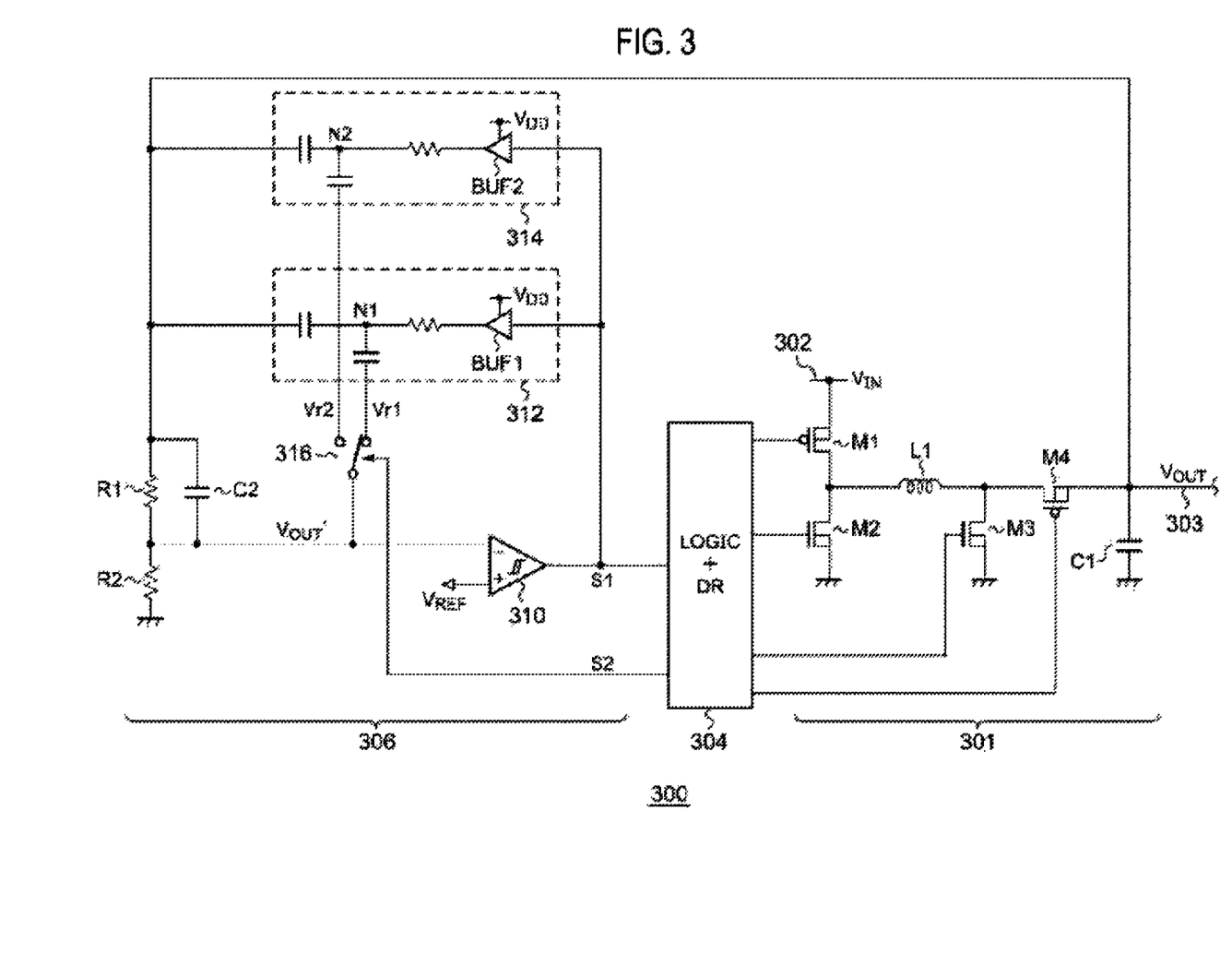
FIG. 3 is a circuit diagram of a ripple injection type step-up/step-down DC/DC converter reviewed by the present inventor.

FIG. 3 is a circuit diagram of a ripple injection type step-up/step-down DC/DC converter 300 reviewed by the present inventor. The step-up/step-down DC/DC converter 300 includes an output circuit 301, a logic unit 304 and a pulse modulator 306. The output circuit 301 includes switching transistors M1 and M3, synchronous rectification transistors M2 and M4, an inductor L1 and an output capacitor C1.

The logic unit 304 is configured to switch between a step-down mode φ1 and a step-up mode φ2. In the step-down mode φ1, with the switching transistor M3 turned off and the synchronous rectification transistor M4 turned on, the logic unit 304 switches the switching transistor M1 and the synchronous rectification transistor M2 based on a pulse signal S1 generated by the pulse modulator 306. More specifically, when the pulse signal S1 has a high level, the logic unit 304 turns on the switching transistor M1 and turns off the synchronous rectification transistor M2. When the pulse signal S1 has a low level, the logic unit 304 turns off the switching transistor M1 and turns on the synchronous rectification transistor M2.

In the step-up mode φ2, with the switching transistor M1 fully-turned on and the synchronous rectification transistor M2 turned off, the logic unit 304 switches the switching transistor M3 and the synchronous rectification transistor M4 based on the pulse signal S1 generated by the pulse modulator 306. More specifically, when the pulse signal S1 has a high level, the logic unit 304 turns on the switching transistor M3 and turns off the synchronous rectification transistor M4. When the pulse signal S1 has a low level, the logic unit 304 turns off the switching transistor M3 and turns on the synchronous rectification transistor M4.

The pulse modulator 306 includes resistors R1 and R2, a capacitor C2, a hysteresis comparator 310, a first ripple injection circuit 312, a second ripple injection circuit 314 and a selector 316.

The first ripple injection circuit 312 generates a ripple to be superimposed on a feedback voltage $V_{OUT}'$ in the step-down mode φ1. The second ripple injection circuit 314 generates a ripple to be superimposed on the feedback voltage $V_{OUT}'$ in the step-up mode φ2. The selector 316 selects the ripple generated by the first ripple injection circuit 312 in the step-down mode φ1 and injects it into an inverted input terminal of the hysteresis comparator 310. In addition, the selector 316 selects the ripple generated by the second ripple injection circuit 314 in the step-up mode φ2 and injects it into the inverted input terminal of the hysteresis comparator 310.

The logic unit 304 selects one of the step-down mode φ1 and the step-up mode φ2 based on a relationship between an input voltage $V_{IN}$ and an output voltage $V_{OUT}$ and switches the transistors M1 to M4 in response to the selected mode and the pulse signal S1. In addition, the logic unit 304 generates a mode signal S2 and controls the selector 316.

With the step-up/step-down DC/DC converter 300 of FIG. 3, it is possible to superimpose a proper ripple on an input side of the hysteresis comparator 310 by the first ripple injection circuit 312 in the step-down mode φ1 and by the second ripple injection circuit 314 in the step-up mode φ2.

The step-up/step-down DC/DC converter 300 of FIG. 3 should not be construed as techniques known in the art and problems to be explained later should not be understood as common recognition of those skilled in the art.

In a step-up/step-down DC/DC converter 300, in some cases, the step-down mode φ1 and the step-up mode φ2 may be dynamically switched based on a magnitude relationship between the input voltage $V_{IN}$ and the output voltage $V_{OUT}$ and/or a load current.

Figure 4A:
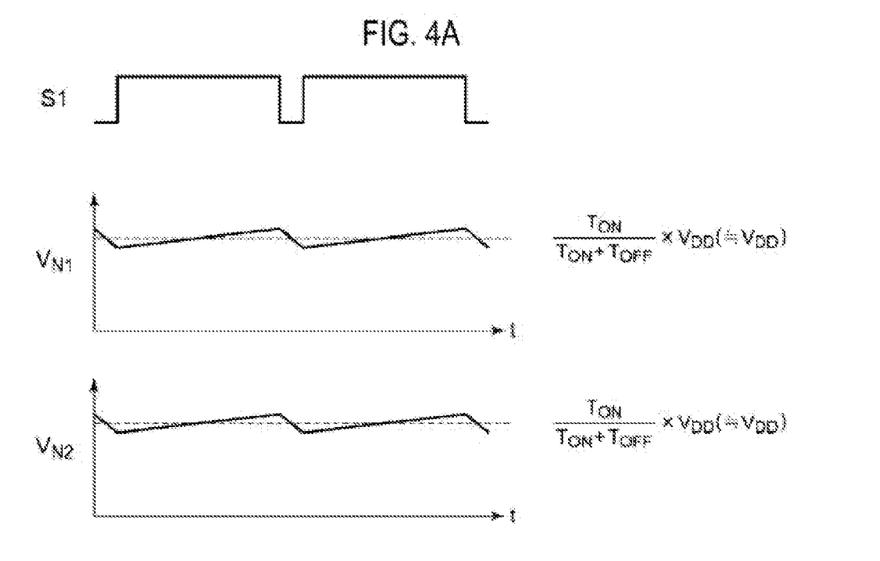
FIGS. 4A and 4B are operation waveform diagrams of the step-up/step-down DC/DC converter of FIG. 3.
Figure 4B:
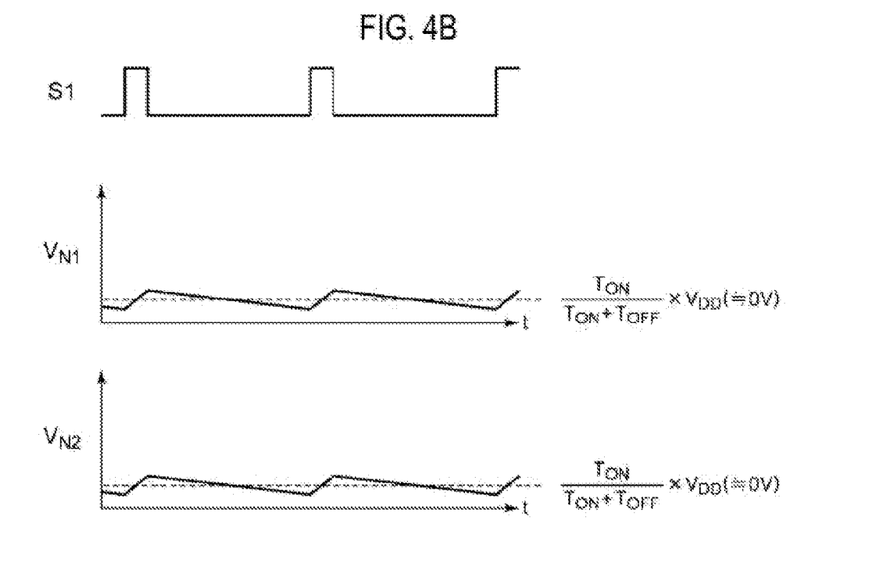

FIGS. 4A and 4B are operation waveform diagrams of the step-up/step-down DC/DC converter 300 of FIG. 3. FIG. 4A shows the pulse signal S1 and voltages $V_{N1}$ and $V_{N2}$ at respective nodes N1 and N2 in the step-down mode φ1, and FIG. 4B shows the pulse signal S1 and voltages $V_{N1}$ and $V_{N2}$ at the respective nodes N1 and N2 in the step-up mode φ2.

As shown in FIG. 4A, in the step-down mode φ1, both of a baseline for the voltage $V_{N1}$ at the node N1 and a baseline for the voltage $V_{N2}$ at the node N2 are $T_{ON}/(T_{ON}+T_{OFF}) \times V_{DD}$. As shown in FIG. 4B, in the step-up mode φ2, both of a baseline for the voltage $V_{N1}$ at the node N1 and a baseline for the voltage $V_{N2}$ at the node N2 are $T_{ON}/(T_{ON}+T_{OFF}) \times V_{DD}$. $V_{DD}$ is a power supply voltage of each of a first buffer BUF1 of the first ripple injection circuit 312 and a second buffer BUF2 of the second ripple injection circuit 314. For example, the input voltage $V_{IN}$ may be used as $V_{DD}$.

Here, switching between the step-down mode and the step-up mode occurs in a state of $V_{IN} \approx V_{OUT}$. In the step-down mode φ1, since a duty cycle $T_{ON}/(T_{ON}+T_{OFF})$ of the pulse signal S1 is $V_{OUT}/V_{IN}$, $T_{ON}/(T_{ON}+T_{OFF}) \approx 1$ when $V_{IN} \approx V_{OUT}$. That is, the baselines for the voltages $V_{N1}$ and $V_{N2}$ in the step-down mode φ1 lie near the input voltage $V_{DD}$ (=$V_{IN}$).

On the other hand, in the step-up mode φ2, since the duty cycle $T_{ON}/(T_{ON}+T_{OFF})$ of the pulse signal S1 is $(V_{OUT}-V_{IN})/V_{OUT}$, $T_{ON}/(T_{ON}+T_{OFF}) \approx 0$ when $V_{IN} \approx V_{OUT}$. That is, the baselines for the voltages $V_{N1}$ and $V_{N2}$ lie near a ground voltage.

Assuming that the step-up/step-down DC/DC converter 300 is switched from the step-down mode φ1 to the step-up mode φ2, in the step-up mode φ2 after the switching, there is a need to superimpose a ripple voltage $V_{N2}$ near the ground voltage shown in FIG. 4B on the feedback voltage $V_{OUT}'$. However, in the step-down mode φ1 before the switching, the ripple voltage $V_{N2}$ takes a value of the power supply voltage $V_{DD}$. That is, the voltage $V_{N2}$ at the node N2 before the mode switching is significantly different from that after the mode switching.

This may be equally applied to a case where the step-up/step-down DC/DC converter 300 is switched from the step-up mode φ2 to the step-down mode φ1. In the step-down mode φ1 after the switching, there is a need to superimpose a ripple voltage $V_{N1}$ near the power supply voltage $V_{DD}$ shown in FIG. 4A on the feedback voltage $V_{OUT}'$. However, in the step-up mode φ2 before the switching, the ripple voltage $V_{N1}$ takes a value near the ground voltage 0V. That is, the voltage $V_{N1}$ at the node N1 before the mode switching is significantly different from that after the mode switching.

Therefore, in the step-up/step-down DC/DC converter 300 of FIG. 3, before and after the mode switching, it takes a long time for the feedback voltage $V_{OUT}'$ to converge to a stable point in the mode after the switching. This may result in overshoot or undershoot of the output voltage $V_{OUT}$ and it requires a long time for the output voltage $V_{OUT}$ to be stabilized to a target level.

Figure 5:
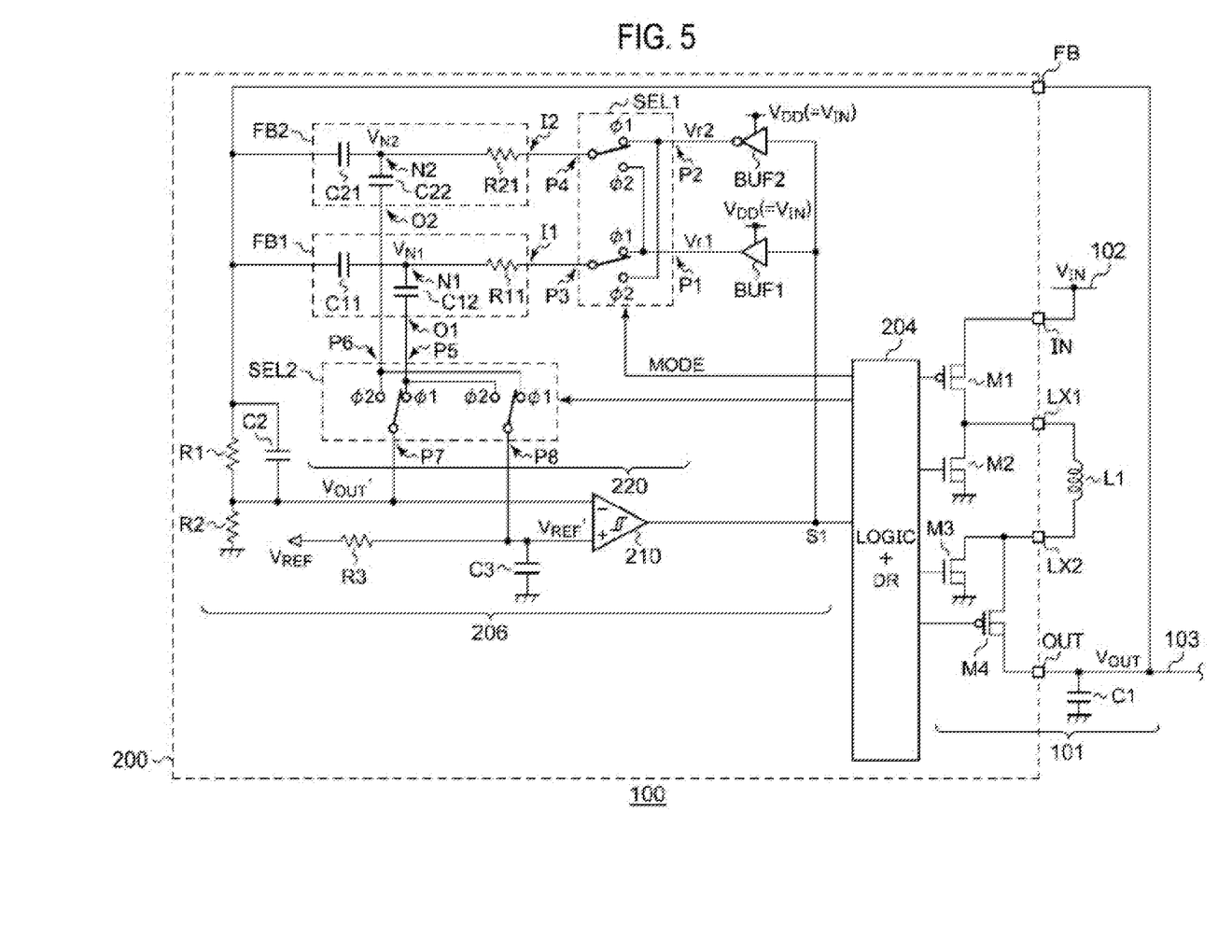
FIG. 5 is a circuit diagram of a step-up/step-down DC/DC converter according to an embodiment.

FIG. 5 is a circuit diagram of a step-up/step-down DC/DC converter (hereinafter sometimes simply referred to as a DC/DC converter) 100 according to an embodiment. The step-up/step-down DC/DC converter 100 is configured to switch between a step-down mode φ1 to step down an input voltage $V_{IN}$ of an input line 102 and a step-up mode φ2 to step up the input voltage $V_{IN}$ and supplies an output voltage $V_{OUT}$ to a load (not shown) connected to an output line 103. The DC/DC converter 100 includes an output circuit 101 and a control circuit 200.

The output circuit 101 includes the input line 102, the output line 103, a first switching transistor M1, a first synchronous rectification transistor M2, a second switching transistor M3, a second synchronous rectification transistor M4, an inductor L1 and an output capacitor C1. The output circuit 101 has the same configuration as the output circuit 301 of FIG. 3.

The control circuit 200 switches the first switching transistor M1, the first synchronous rectification transistor M2, the second switching transistor M3 and the second synchronous rectification transistor M4 such that the output voltage $V_{OUT}$ becomes close to a target value. The control circuit 200 may be a functional IC integrated on a single semiconductor substrate. Although, in this embodiment, the first switching transistor M1, the first synchronous rectification transistor M2, the second switching transistor M3 and the second synchronous rectification transistor M4 may be integrated in the control circuit 200. Alternatively, the first switching transistor M1, the first synchronous rectification transistor M2, the second switching transistor M3 and the second synchronous rectification transistor M4 may be external components attached to the control circuit 200.

The output voltage $V_{OUT}$ is input to a feedback terminal (FB) of the control circuit 200. The inductor L1 is externally connected between a first switching node (LX1 terminal) and a second switching node (LX2 terminal) of the control circuit 200. The output line 103 and the output capacitor C1 are connected to an output terminal (OUT) of the control circuit 200. The first switching transistor M1 is connected between the input line 102 and the LX1 terminal and the first synchronous rectification transistor M2 is connected between the LX1 terminal and a ground line. The second switching transistor M3 is connected between the LX2 terminal and the ground line and the second synchronous rectification transistor M4 is connected between the LX2 terminal and the output terminal OUT.

The control circuit 200 includes a logic unit 204 and a pulse modulator 206 in addition to the transistors M1 to M4.

The pulse modulator 206 generates a pulse signal S1 having a duty cycle adjusted such that the output voltage $V_{OUT}$ becomes close to the target value. The pulse modulator 206 includes resistors R1 and R2, a capacitor C2, a hysteresis comparator 210, a first buffer BUF1, a second buffer BUF2 and a feedback circuit 220.

The resistors R1 and R2 and the capacitor C2 divide the output voltage $V_{OUT}$ to generate a feedback voltage $V_{OUT'}$ proportional to the output voltage $V_{OUT}$. With respect to a DC component (baseline) of each voltage, the following equation is established.

$$V_{OUT'} = V_{OUT} R2/(R1+R2)$$

The hysteresis comparator 210 has a first input terminal (inverted (−) input terminal) to receive the feedback voltage $V_{OUT'}$. In addition, the hysteresis comparator 210 has a second input terminal (non-inverted (+) input terminal) to receive a reference voltage $V_{REF}$ via a resistor R3 and a capacitor C3. A voltage of the non-inverted input terminal of the hysteresis comparator 210 is denoted by $V_{REF'}$. The hysteresis comparator 210 compares the feedback voltage $V_{OUT'}$ with threshold voltages $V_H$ and $V_L$ corresponding to the reference voltage $V_{REF'}$ and generates the pulse signal S1 indicating a result of the comparison.

The logic unit 204 selects one of the step-down mode φ1 and the step-up mode φ2. The logic unit 204 may determine an operation mode either according to a command from a host processor (not shown) or autonomously based on a state of the control circuit 200.

In the step-down mode φ1, the logic unit 204 complementarily switches the first switching transistor M1 and the first synchronous rectification transistor M2 based on the pulse signal S1, with the second switching transistor M3 turned off and the second synchronous rectification transistor M4 turned on. More specifically, when the pulse signal S1 has a high level, the switching transistor M1 is turned on and the synchronous rectification transistor M2 is turned off. When the pulse signal S1 has a low level, the switching transistor M1 is turned off and the synchronous rectification transistor M2 is turned on.

In the step-up mode φ2, the logic unit 204 complementarily switches the second switching transistor M3 and the second synchronous rectification transistor M4 based on the pulse signal S1, with the first switching transistor M1 turned on and the first synchronous rectification transistor M2 turned off. More specifically, when the pulse signal S1 has a high level, the switching transistor M3 is turned on and the synchronous rectification transistor M4 is turned off. When the pulse signal S1 has a low level, the switching transistor M3 is turned off and the synchronous rectification transistor M4 is turned on.

The first buffer BUF1 generates a first ripple voltage Vr1 of a first polarity, which is synchronized with the pulse signal S1. The second buffer BUF2 generates a second ripple voltage Vr2 of a second polarity having a phase opposite to that of the first polarity, which is synchronized with the pulse signal S1.

The feedback circuit 220 includes a first feedback path FB1, a second feedback path FB2, a first selector SEL1 and a second selector SEL2.

The feedback circuit 220 is configured to superimpose the first ripple voltage Vr1 on a non-inverted input terminal side of the hysteresis comparator 210, that is, the feedback voltage $V_{OUT'}$ via the first feedback path FB1 and superimposes the second ripple voltage Vr2 on an inverted input terminal side of the hysteresis comparator 210, that is, the reference voltage $V_{REF'}$ via the second feedback path FB2 in the step-down mode φ1. In addition, the feedback circuit 220 is configured to superimpose the first ripple voltage Vr1 on the feedback voltage $V_{OUT'}$ via the second feedback path FB2 and superimposes the second ripple voltage Vr2 on the reference voltage $V_{REF'}$ via the first feedback path FB1 in the step-up mode φ2.

The first feedback path FB1 includes a first feedback resistor R11, a first feedback capacitor C12 and a third feedback capacitor C11. The first feedback resistor R11 and the first feedback capacitor C12 are connected in series between an input terminal I1 and an output terminal O1 of the first feedback path FB1. The third feedback capacitor C11 is connected between the output line 103 and a connection node N1 between the first feedback resistor R11 and the first feedback capacitor C12.

The second feedback path FB2 includes a second feedback resistor R21, a second feedback capacitor C22 and a fourth feedback capacitor C2 and has the same configuration as the first feedback path FB1.

Resistances of the first feedback resistor R11 and the second feedback resistor R21 may be equal to each other. Capacitances of the first feedback capacitor C12 and the second feedback capacitor C22 may be equal to each other. Capacitances of the third feedback capacitor C11 and the fourth feedback capacitor C21 may be equal to each other.

Thus, it is possible to align levels of voltages $V_{N1}$ and $V_{N2}$ generated inside the first feedback path FB1 and the second feedback path FB2.

The first selector SEL1 includes first to fourth terminals P1 to P4. The first terminal P1 is connected to an output terminal of the first buffer BUF1 and the second terminal P2 is connected to an output terminal of the second buffer BUF2. The third terminal P3 is connected to the input terminal I1 of the first feedback path FB1 and the fourth terminal P4 is connected to an input terminal I2 of the second feedback path FB2. The first selector SEL1 is configured to electrically conduct between the first terminal P1 and the third terminal P3 and between the second terminal P2 and the fourth terminal P4 in the step-down mode φ1 and electrically conduct between the first terminal P1 and the fourth terminal P4 and between the second terminal P2 and the third terminal P3 in the step-up mode φ2. However, the configuration of the first selector SEL1 is not particularly limited.

The second selector SEL2 includes fifth to eighth terminals P5 to P8. The fifth terminal P5 is connected to the output terminal O1 of the first feedback path FB1 and the sixth terminal P6 is connected to an output terminal O2 of the second feedback path FB2. The seventh terminal P7 is connected to the first input terminal (inverted input terminal) of the hysteresis comparator 210 and the eighth terminal P8 is connected to the second input terminal (non-inverted input terminal) of the hysteresis comparator 210. The second selector SEL2 is configured to electrically conduct between the fifth terminal P5 and the seventh terminal P7 and between the sixth terminal P6 and the eighth terminal P8 in the step-down mode φ1 and electrically conduct between the fifth terminal P5 and the eighth terminal P8 and between t e sixth terminal P6 and the seventh terminal P7 in the step-up mode φ2.

Subsequently, the first buffer BUF1 and the second buffer BUF2 to generate the first ripple voltage Vr1 and the second ripple voltage Vr2, respectively, will be described. The first buffer BUF1 may be configured as an inversion type or non-inversion type buffer to receive a first signal S11 synchronized with the pulse signal S1. The second buffer BUF2 may be configured as an inversion type or non-inversion type buffer to receive a second signal S12 synchronized with the pulse signal S1.

When the first signal S11 and the second signal S12 have the same logical value as in this embodiment, one of the first buffer BUF1 and the second buffer BUF2 may be of an inversion type and the other may be of a non-inversion type. Specifically, when the first signal S11 and the second signal S12 have the same logical value as the pulse signal S1, the first buffer BUF1 may be of the non-inversion type and the second buffer BUF2 may be of the inversion type.

The configuration of the step-up/step-down DC/DC converter 100 has been described above. Subsequently, an operation thereof will be described.

Figure 6:
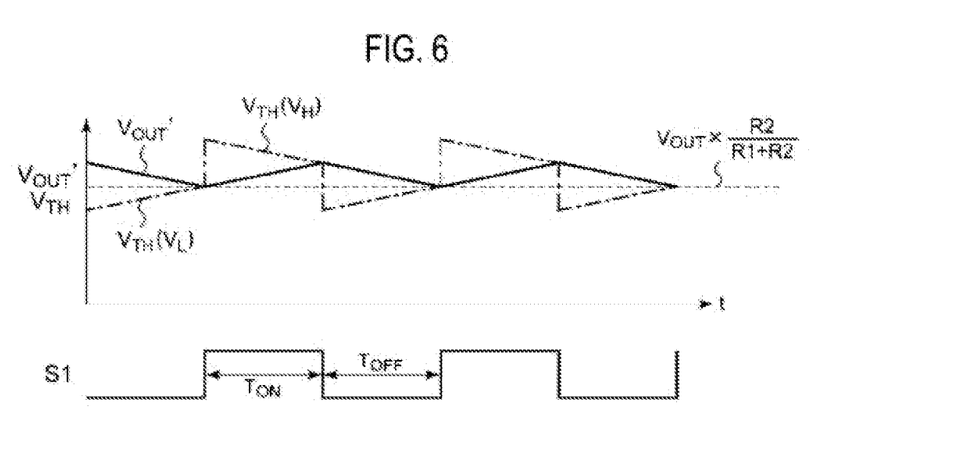
FIG. 6 is an operation waveform diagram of the step-up/step-down DC/DC converter of FIG. 5.

FIG. 6 is an operation waveform diagram of the step-up/step-down DC/DC converter 100 of FIG. 5. In either the step-down mode φ1 or the step-up mode φ2, a first ripple having a normal phase (first polarity) is superimposed on the inverted (−) input terminal of the hysteresis comparator 210 and a second ripple having a reverse phase (second polarity) is superimposed on the non-inverted (+) input terminal of the hysteresis comparator 210. Accordingly, the output voltage $V_{OUT'}$ is increased when the pulse signal S1 has a high level and is decreased when the pulse signal S1 has a low level. In addition, the reference voltage $V_{REF'}$ is decreased when the pulse signal S1 has a high level and is increased when the pulse signal S1 has a low level.

During the ON period $T_{ON}$ of the pulse signal S1, a threshold voltage $V_{TH}$ of the hysteresis comparator 210 takes an upper level $V_H$ which is decreased with the decrease of the reference voltage $V_{REF'}$. Conversely, the feedback voltage $V_{OUT'}$ is increased. When $V_{OUT'} > V_H$, the output S1 of the hysteresis comparator 210 transitions to a low level.

During the low level period $T_{OFF}$ of the pulse signal S1, the threshold voltage $V_{TH}$ of the hysteresis comparator 210 takes a lower level $V_L$ which is increased with the increase of the reference voltage $V_{REF'}$. Conversely, the feedback voltage $V_{OUT'}$ is decreased. When $V_{OUT'} < V_L$, the output S1 of the hysteresis comparator 210 transitions to a high level.

Thus, the feedback voltage $V_{OUT'}$ is stabilized near the reference voltage $V_{REF}$.

Subsequently, switching of the step-up/step-down DC/DC converter 100 between the step-down mode φ1 and the step-up mode φ2 will be described.

Figure 7A:
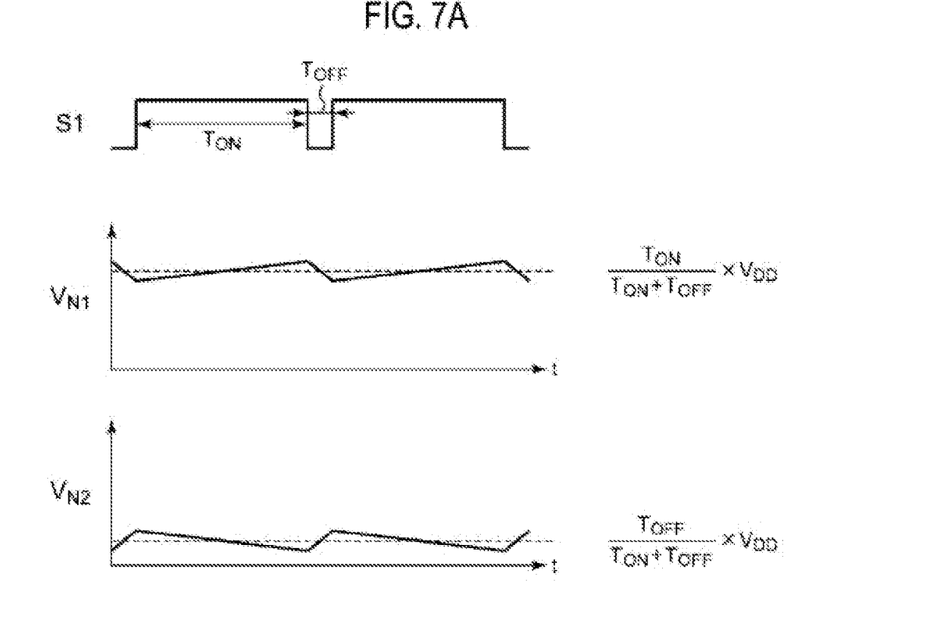
FIGS. 7A and 7B are operation waveform diagrams of the step-up/step-down DC/DC converter of FIG. 5.
Figure 7B:
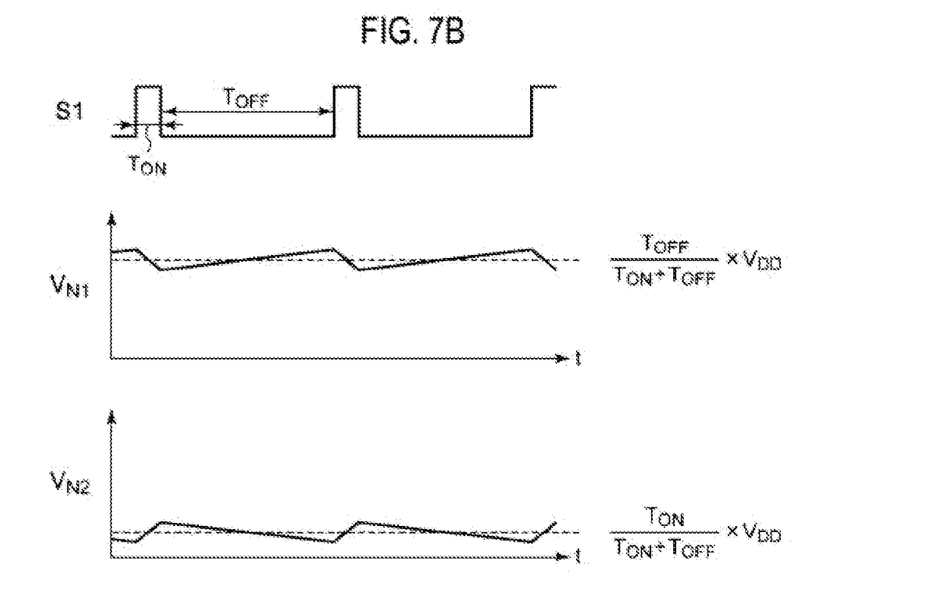

FIGS. 7A and 7B are operation waveform diagrams of the step-up/step-down DC/DC converter 100 of FIG. 5. FIG. 7A shows the pulse signal S1, the voltage $V_{N1}$ at the node N1 and the voltage $V_{N2}$ at the node N2 in the step-down mode φ1, respectively, and FIG. 7B shows the pulse signal S1, the voltage $V_{N1}$ at the node N1 and the voltage $V_{N2}$ at the node N2 in the step-up mode φ2.

In the step-down mode φ1, a baseline for the voltage $V_{N1}$ at the node N1 of the first feedback circuit FB1 is $T_{ON}/(T_{ON}+T_{OFF}) \times V_{DD}$ and a baseline for the voltage $V_{N2}$ at the node N2 of the second feedback circuit FB2 is $T_{OFF}/(T_{ON}+T_{OFF}) \times V_{DD}$. $V_{DD}$ is a power supply voltage of each of the buffers BUF1 and BUF2. In this embodiment, the input voltage $V_{IN}$ may be used as $V_{DD}$.

On the other hand, in the step-up mode φ2, a baseline for the voltage $V_{N1}$ at the node N1 of the first feedback circuit FB1 is $T_{OFF}/(T_{ON}+T_{OFF}) \times V_{DD}$ and a baseline for the voltage $V_{N2}$ at the node N2 of the second feedback circuit FB2 is $T_{ON}/(T_{ON}+T_{OFF}) \times V_{DD}$.

Here, switching between the step-down mode φ1 and the step-up mode φ2 occurs in a state of $V_{IN} \approx V_{OUT}$. In the step-down mode φ1, since a duty cycle $T_{ON}/(T_{ON}+T_{OFF})$ of the pulse signal S1 is $V_{OUT}/V_{IN}$, $T_{ON}/(T_{ON}+T_{OFF}) \approx 1$ when $V_{IN} \approx V_{OUT}$. That is, the baseline for the voltage $V_{N1}$ lies near the input voltage $V_{DD}$ (=$V_{IN}$) and the baseline for the voltage $V_{N2}$ lies near the ground voltage 0V.

On the other hand, in the step-up mode φ2, since the duty cycle $T_{ON}/(T_{ON}+T_{OFF})$ of the pulse signal S1 is $(V_{OUT}-V_{IN})/V_{OUT}$, $T_{ON}/(T_{ON}+T_{OFF}) \approx 0$ when $V_{IN} \approx V_{OUT}$. That is, the baseline for the voltage $V_{N1}$ lies near the input voltage $V_{DD}$ (=$V_{IN}$) and the baseline for the voltage $V_{N2}$ lies near the ground voltage 0V.

That is, when $V_{IN} \approx V_{OUT}$, in either the step-down mode φ1 or the step-up mode φ2, the voltage $V_{N1}$ at the node N1 of the first feedback circuit FB1 lies near the input voltage $V_{IN}$ and the voltage $V_{N2}$ at the node N2 of the second feedback circuit FB2 lies near the ground voltage 0V.

Therefore, when switching between the step-down mode φ1 and the step-up mode φ2, a difference between the voltage $V_{N1}$ at the node N1 before the switching and the voltage $V_{N1}$ at the node N1 after the switching is very small and, similarly, a difference between the voltage $V_{N2}$ at the node N2 before the switching and the voltage $V_{N2}$ at the node N2 after the switching is very small.

Therefore, when switching between the step-down mode φ1 and the step-up mode φ2, it is possible to reduce the time required for each of the voltages $V_{N1}$ and $V_{N2}$ at the respective nodes N1 and N2 and the feedback voltage $V_{OUT'}$ to converge to a stable point of the mode after the switching. This allows the output voltage $V_{OUT}$ to be prevented from being overshot or undershot and/or the output voltage $V_{OUT}$ to be stabilized in a shorter time.

Thus, the step-up/step-down DC/DC converter 100 according to the embodiment can provide seamless switching between the step-down mode φ1 and the step-up mode φ2.

Figure 8:
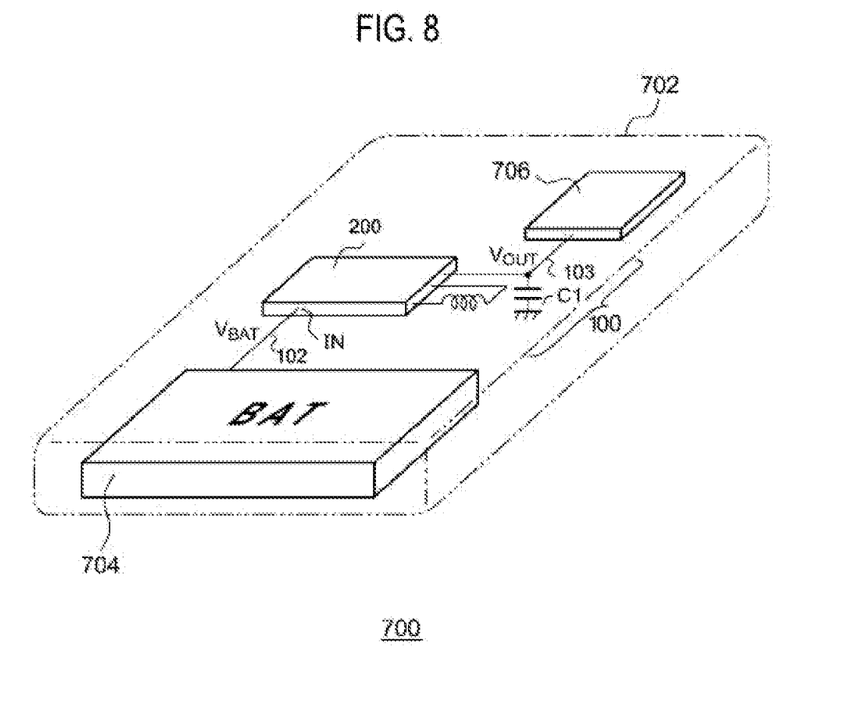
FIG. 8 is a view showing one example of an electronic apparatus using the step-up/step-down DC/DC converter according to the embodiment.

Subsequently, use of the step-up/step-down DC/DC converter 100 will be described. FIG. 8 is a view showing one example of an electronic apparatus 700 using the step-up/step-down DC/DC converter 100 according to the embodiment. The electronic apparatus 700 is a battery-driven apparatus such as a mobile phone, a digital camera, a digital video camera, a tablet terminal, a portable audio player or the like. The electronic apparatus 700 includes a housing 702, a battery 704, a microprocessor 706 and the step-up/step-down DC/DC converter 100. The step-up/step-down DC/DC converter 100 receives a battery voltage $V_{BAT}$ (=$V_{IN}$) from the battery 704 in an input line 102 and supplies an output voltage $V_{OUT}$ to the microprocessor 706 connected to an output line 103.

The particular embodiments of the present disclosure have been described above. However, these embodiments are only illustrative and it is to be understood to those skilled in the art that various modifications to combinations of elements or steps of the embodiments may be made without departing from the scope of the present disclosure, as will be described below.

(Modification 1)

Figure 9:
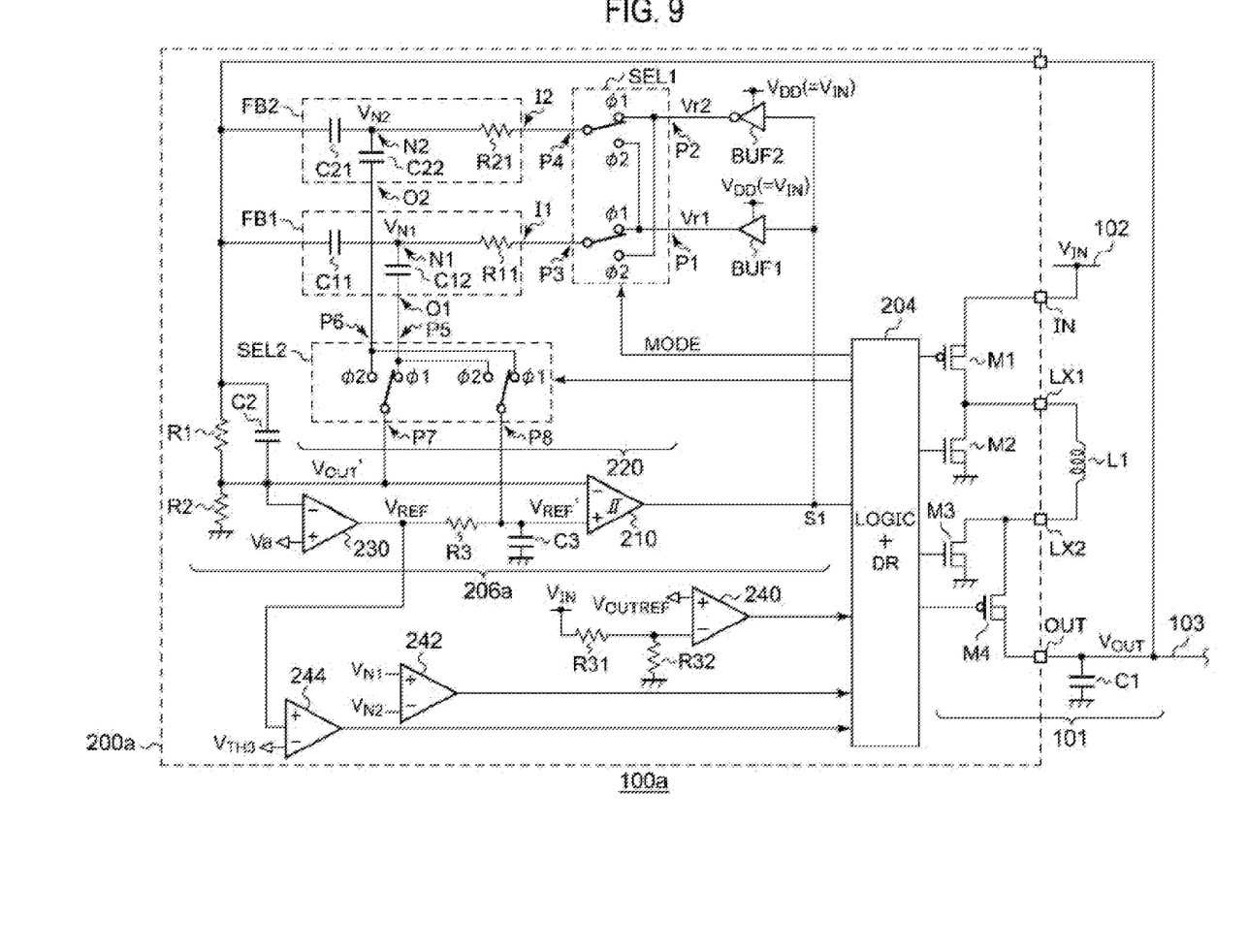
FIG. 9 is a circuit diagram of a step-up/step-down DC/DC converter according to a first modification.

FIG. 9 is a circuit diagram of a step-up/step-down DC/DC converter 100a according to a first modification. Differences between the step-up/step-down DC/DC converter 100a and the step-up/step-down DC/DC converter 100 of FIG. 5 will be described below.

In the step-up/step-down DC/DC converter 100a, a pulse modulator 206a includes an error amplifier 230. The error amplifier 230 amplifies an error between a feedback voltage $V_{OUT'}$ and a predetermined voltage Va to generate a reference voltage $V_{REF}$. This configuration allows an output voltage $V_{OUT}$ to be stabilized near a target level Va×(R1+R2)/R2.

A control circuit 200a includes at least one of a first comparator 240, a second comparator 242 and a third comparator 244, or any combinations thereof, in addition to the pulse modulator 206a.

The first comparator 240 compares an input voltage $V_{IN}$ with a predetermined second threshold voltage $V_{OUTREF}$. The second threshold voltage $V_{OUTREF}$ corresponds to a target level of the output voltage $V_{OUT}$. For example, the first comparator 240 may compare a voltage $V_{IN'}$ obtained by dividing the input voltage $V_{IN}$ by means of resistors R31 and R32 with the predetermined second threshold voltage $V_{OUTREF}$. Based on a result of the comparison, a logic unit 204 selects a step-down mode φ1 if $V_{IN'}>V_{OUTREF}$ and selects a step-up mode φ2 if $V_{IN'}<V_{OUTREF}$.

The second comparator 242 compares a voltage $V_{N1}$ at a node N1 with a voltage $V_{N2}$ at a node N2. Based on a result of the comparison by the second comparator 242, the logic unit 204 switches between the step-down mode φ1 and the step-up mode φ2. As described above, a duty cycle of a pulse signal S1 is reflected in baselines of the voltages $V_{N1}$ and $V_{N2}$ at the respective nodes N1 and N2. Therefore, through the comparison between the voltages $V_{N1}$ and $V_{N2}$, the duty cycle of the pulse signal S1 can be reflected in mode selection.

The third comparator 244 compares the reference voltage $V_{REF}$ generated by the error amplifier 230 with a predetermined third threshold voltage $V_{TH3}$. Based on a result of the comparison by the third comparator 244, the logic unit 204 switches between the step-down mode φ1 and the step-up mode φ2. A load current $I_{OUT}$ is reflected in the reference voltage $V_{REF}$ generated by the error amplifier 230. Therefore, through the comparison between the reference voltage $V_{REF}$ and the threshold voltage $V_{TH3}$, the load current $I_{OUT}$ used to estimate whether the step-up/step-down DC/DC converter 100a is in a light load state or a heavy load state can be reflected in mode selection.

(Modification 2)

The configuration of the first buffer BUF1 and the second buffer BUF2 is not particularly limited. For example, the first buffer BUF1 may be configured as an inversion type by supplying an inversion signal #S1 of the pulse signal S1 generated inside the logic unit 204 to the first buffer BUF1.

In addition, the second buffer BUF2 may also be configured as an inversion type by supplying an inversion signal #S1 of the pulse signal S1 generated inside the logic unit 204 to the second buffer BUF2.

(Modification 3)

The configuration of the first feedback path FB1 and the second feedback path FB2 is not limited to that of the embodiment but may be one of other configurations known in the art.

(Modification 4)

One or both of the first synchronous rectification transistor M2 and the second synchronous rectification transistor M4 may be constituted by diodes.

According to the present disclosure in some embodiments, it is possible to provide seamless switching between a step-down mode and a step-up mode.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a step-up/step-down DC/DC converter, wherein the step-up/step-down DC/DC converter comprises:
   an input line to which an input voltage is applied;
   an output line to which a load is connected;
   a first switching transistor connected between the input line and a first switching node;
   a first rectification element connected between the first switching node and a ground;
   an inductor connected between the first switching node and a second switching node;
   a second switching transistor connected between the second switching node and the ground;
   a second rectification element connected between the second switching node and the output line; and
   an output capacitor connected between the output line and the ground,
   the control circuit comprising:
   a hysteresis comparator configured to receive a feedback voltage corresponding to an output voltage generated in the output line at a first input terminal and a reference voltage at a second input terminal, compare the feedback voltage with a threshold voltage corresponding to the reference voltage, and generate a pulse signal indicating a result of the comparison;
   a logic unit configured to fix the second switching transistor at an OFF state and switch the first switching transistor based on the pulse signal in a step-down mode and fix the first switching transistor at an ON state and switch the second switching transistor based on the pulse signal in a step-up mode;

a first buffer configured to generate a first ripple voltage having a first polarity which is synchronized with the pulse signal;

a second buffer configured to generate a second ripple voltage having a second polarity which is synchronized with the pulse signal, the second polarity being opposite in phase to the first polarity; and a feedback circuit which includes a first feedback path and a second feedback path and is configured to superimpose the first ripple voltage on the feedback voltage via the first feedback path and superimpose the second ripple voltage on the reference voltage via the second feedback path in the step-down mode and superimpose the first ripple voltage on the feedback voltage via the second feedback path and superimpose the second ripple voltage on the reference voltage via the first feedback path in the step-up mode.

2. The control circuit of claim 1, wherein the first feedback path includes a first feedback resistor and a first feedback capacitor connected in series between an input terminal and an output terminal of the first feedback path, and wherein the second feedback path includes a second feedback resistor and a second feedback capacitor connected in series between an input terminal and an output terminal of the second feedback path.

3. The control circuit of claim 2, wherein resistance of the first feedback resistor is equal to that of the second feedback resistor and capacitance of the first feedback capacitor is equal to that of the second feedback capacitor.

4. The control circuit of claim 2, wherein the first feedback path further includes a third feedback capacitor connected between the output line and a connection node between the first feedback resistor and the first feedback capacitor, and wherein the second feedback path further includes a fourth feedback capacitor connected between the output line and a connection node between the second feedback resistor and the second feedback capacitor.

5. The control circuit of claim 4, wherein capacitance of the third feedback capacitor is equal to that of the fourth feedback capacitor.

6. The control circuit of claim 1, wherein the feedback circuit further includes:

a first selector which comprises a first terminal connected to an output terminal of the first buffer, a second terminal connected to an output terminal of the second buffer, a third terminal connected to the input terminal of the first feedback path, and a fourth terminal connected to the input terminal of the second feedback path and is configured to electrically conduct between the first terminal and the third terminal and between the second terminal and the fourth terminal in the step-down mode and electrically conduct between the first terminal and the fourth terminal and between the second terminal and the third terminal in the step-up mode; and a second selector which comprises a fifth terminal connected to the output terminal of the first feedback path, a sixth terminal connected to the output terminal of the second feedback path, a seventh terminal connected to the first input terminal of the hysteresis comparator, and an eighth terminal connected to the second input terminal of the hysteresis comparator and is configured to electrically conduct between the fifth terminal and the seventh terminal and between the sixth terminal and the eighth terminal in the step-down mode and electrically conduct between the fifth terminal and the eighth terminal and between the sixth terminal and the seventh terminal in the step-up mode.

7. The control circuit of claim 1, wherein the first buffer is an inversion type or non-inversion type buffer to receive a first signal synchronized with the pulse signal, and wherein the second buffer is an inversion type or non-inversion type buffer to receive a second signal synchronized with the pulse signal.

8. The control circuit of claim 7, wherein the first signal and the second signal have the same logical value, and wherein one of the first buffer and the second buffer is of the non-inversion type and the other is of the inversion type.

9. The control circuit of claim 7, wherein each of the first signal and the second signal is the pulse signal.

10. The control circuit of claim 7, wherein the first signal has the same logical value as the pulse signal and the first buffer is of the non-inversion type.

11. The control circuit of claim 7, wherein the first signal has an inverted logical value of the pulse signal and the first buffer is of the inversion type.

12. The control circuit of claim 7, wherein the second signal has the same logical value as the pulse signal and the second buffer is of the inversion type.

13. The control circuit of claim 7, wherein the second signal has an inverted logical value of the pulse signal and the second buffer is of the non-inversion type.

14. The control circuit of claim 1, further comprising an error amplifier configured to amplify an error between the feedback voltage and a predetermined first voltage to generate the reference voltage.

15. The control circuit of claim 1, further comprising a first comparator configured to compare the input voltage with a predetermined second threshold voltage, wherein the logic unit switches between the step-down mode and the step-up mode based on a result of the comparison by the first comparator.

16. The control circuit of claim 2, further comprising a second comparator configured to compare a voltage at a node between the first feedback resistor and the first feedback capacitor with a voltage at a node between the second feedback resistor and the second feedback capacitor, wherein the logic unit switches between the step-down mode and the step-up mode based on a result of the comparison by the second comparator.

17. The control circuit of claim 14, further comprising a third comparator configured to compare the reference voltage with a predetermined third threshold voltage, wherein the logic unit switches between the step-down mode and the step-up mode based on a result of the comparison by the third comparator.

18. The control circuit of claim 1, wherein each of the first rectification element and the second rectification element is a MOSFET (Metal Oxide Semiconductor Field Effect Transistor), and wherein the logic unit fixes the MOSFET of the second rectification element at an ON state and complementarily switches the MOSFET of the first rectification element and the first switching transistor based on the pulse signal in the step-down mode and fixes the MOSFET of the second rectification element at an OFF state and complementarily switches the MOSFET of the first rectification element and the second switching transistor based on the pulse signal in the step-up mode.

19. The control circuit of claim 1, wherein the first rectification element and the second rectification element are constituted by diodes.

20. The control circuit of claim 1, wherein the control circuit is integrated on a single semiconductor substrate.

21. The control circuit of claim 1, wherein the control circuit comprises the first switching transistor, the first rectification element, the second switching transistor and the second rectification element which are monolithically integrated.

22. A step-up/step-down DC/DC converter comprising:
   an input line to which an input voltage is applied;
   an output line to which a load is connected;
   a first switching transistor connected between the input line and a first switching node;
   a first rectification element connected between the first switching node and a ground;
   an inductor connected between the first switching node and a second switching node;
   a second switching transistor connected between the second switching node and the ground;
   a second rectification element connected between the second switching node and the output line;
   an output capacitor connected between the output line and the ground; and
   the control circuit of claim 1, which controls the first switching transistor, the first rectification element, the second switching transistor and the second rectification element.

23. An electronic apparatus comprising the step-up/step-down DC/DC converter of claim 22.

* * * * *